(12) United States Patent
Albo et al.

(10) Patent No.: US 6,477,927 B1
(45) Date of Patent: Nov. 12, 2002

(54) METHOD FOR IMPROVING THE MACHINING ACCURACY OF A PRECISION MACHINE TOOL

(75) Inventors: Ronald Thomas Albo, Campbell, CA (US); Lev Mikhailovich Dvoskin, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 22 days.

(21) Appl. No.: 09/642,611

(22) Filed: Aug. 17, 2000

Related U.S. Application Data

(60) Provisional application No. 60/175,571, filed on Jan. 11, 2000.

(51) Int. Cl.⁷ ................................................. B23B 1/00
(52) U.S. Cl. .............................. 82/1.11; 82/47; 82/118
(58) Field of Search ............................. 82/1.11, 46, 47, 82/118, 173, 900, 903, 904

(56) References Cited

U.S. PATENT DOCUMENTS

| | | | | |
|---|---|---|---|---|
| 4,047,469 A | * | 9/1977 | Sakata | 82/1.11 X |
| 4,928,561 A | * | 5/1990 | Fouche | 82/1.11 |
| 5,779,369 A | * | 7/1998 | Kitamura | 384/517 |
| 5,795,037 A | * | 8/1998 | Hagelthorn | 301/124.1 |
| 6,042,273 A | * | 3/2000 | Thraser | 384/517 |
| 6,088,903 A | * | 7/2000 | Matsuo | 29/558 |

* cited by examiner

Primary Examiner—Henry Tsai

(57) ABSTRACT

The operating precision of super precise machine tools can be significantly improved over their design specifications by the combination of careful set up, testing of the specific machine tool to determine the most accurate operating parameters of accuracy-critical components, providing suitably rigid cutting tool holders, and controlling the operation of the machine tool to operate within the most accurate operating parameters. Testing includes determining optimal operating speeds to achieve the best precision, resonant frequencies to be avoided, and cutting tool feed rates that deliver the most precision. Controlling the machine tool operation includes selecting the most beneficial rotational speed, feeding the cutting tool into the work piece at the most accurate speed and depth of cut, and always feeding the cutting tool into the work piece in one direction.

9 Claims, 2 Drawing Sheets

METHOD FOR IMPROVING THE MACHINING ACCURACY OF A PRECISION MACHINE TOOL

RELATED APPLICATION

This application claims the benefit of U.S. Provisional Patent Application 60/175,571, filed on Jan. 11, 2000.

TECHNICAL FIELD OF THE INVENTION

The present invention relates generally to improving the machining accuracy of a precision machine tool such as a lathe by testing the accuracy-affecting components of the tool to determine the most accurate operating range of the machine, placing the cutting tool in a rigid support device, and operating the tool under carefully controlled conditions.

BACKGROUND ART

The ultimate purpose of a machining technology is to produce parts which meet all specifications in the minimum possible time on the least expensive equipment, leading thereby to least cost. In the specific field of ultra precise machining wherein tolerances of the finished product are in the order of micrometers the difference of machine tool cost and cycle time between super precision tools and ultra precision tools is significant. The cost of the finished product is directly related to the machine tool cycle time, that is, the time required after machine set up to load, conduct the metal cutting operation and unload the machine. Machine tools referred to as "super precise" tools typically provide precision in the order of plus or minus five micrometers but inherently operate significantly faster than machine tools referred to as "ultra precise" tools which provide precision in the order of plus or minus one micrometer. Therefore cycle time can be reduced if super precise machine tools can be made to provide ultra precise results.

The dynamic load deformation behavior of the spindle of a machine tool such as a lathe depends on the distribution of the component mass and the damping characteristics of the entire spindle system. Super precision lathes are usually equipped with belt driven ball or roller bearing spindles and may have a collet closure mechanism. Typical run out values for this type of spindle are in the order of five micrometers. The major sources of spindle run out error are unbalanced spindle parts such as the chuck, collet closure mechanism, brake disk, and the like.

Cutting speed, feed rate, and depth of cut all have significant impacts on accuracy of machining. Each of these factors has its own operating range and limits. Changes in one parameter affect the other parameters. For example, to increase cutting speed requires consideration of spindle run out behavior, thermal resistance of the material of the cutting tool, tool chatter and the like. Feed rate will be limited by the tool nose geometry and tool deflection under cutting forces. Depth of cut will be limited by the tool cutting edge geometry, the stiffness of the cutting tool and the rigidity of the tool clamping device.

Hysteresis on the positioning of the tool slides on the machine results from back lash (slack) in the slide drive system. The small deflections of the slide drive system joints, from the position motor to the coupling to the ball drive screw to the slide to the tool, all build up under reaction to the cutting forces at the tool cutting surface. When the direction of the tool motion is changed, all these small deflections reverse, registering in the positioning system sensors but not actually moving the cutting tool. These registered changes without corresponding actual tool movement limit the precision of the machine tool.

BRIEF DISCLOSURE OF THE INVENTION

The operating precision of super precise machine tools such as lathes can be significantly improved over their advertised design specifications by the combination of careful set up, testing of the specific machine tool to determine the most accurate operating parameters of accuracy-critical components, and controlling the operating of the machine tool to operate within the most accurate operating parameters. Set up includes minimizing physical looseness; verifying alignment and balance of rotating components, including the work piece to be machined; and securely mounting cutting tools in rigid tool holders. Testing includes determining optimal operating speeds to achieve the best precision, resonant frequencies to be avoided, and cutting tool feed rates that deliver the most precision. Controlling the tool operation includes selecting the most beneficial rotational speed, feeding the cutting tool into the work piece at the most accurate speed and depth of cut, and always feeding the cutting tool into the work piece in one direction.

BRIEF DESCRIPTION OF DRAWINGS

For fuller understanding of the present invention, reference is made to the accompanying drawing in the following detailed description of the Best Mode For Carrying Out the Invention. In the drawing.

BEST MODE FOR CARRYING OUT THE INVENTION

Figure 1A:
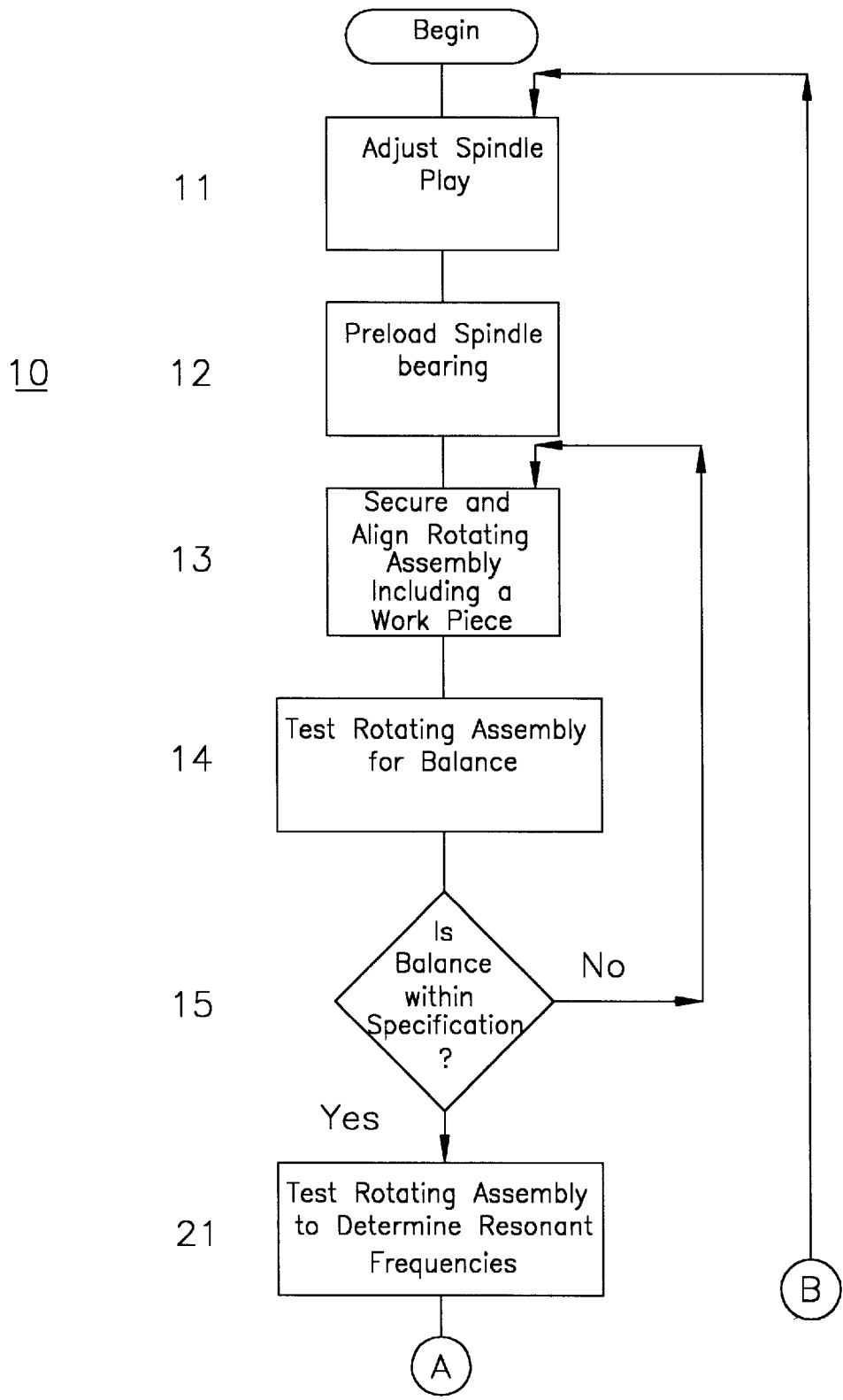
FIG. 1 is a flow diagram illustrating the steps of the invention.
Figure 1B:
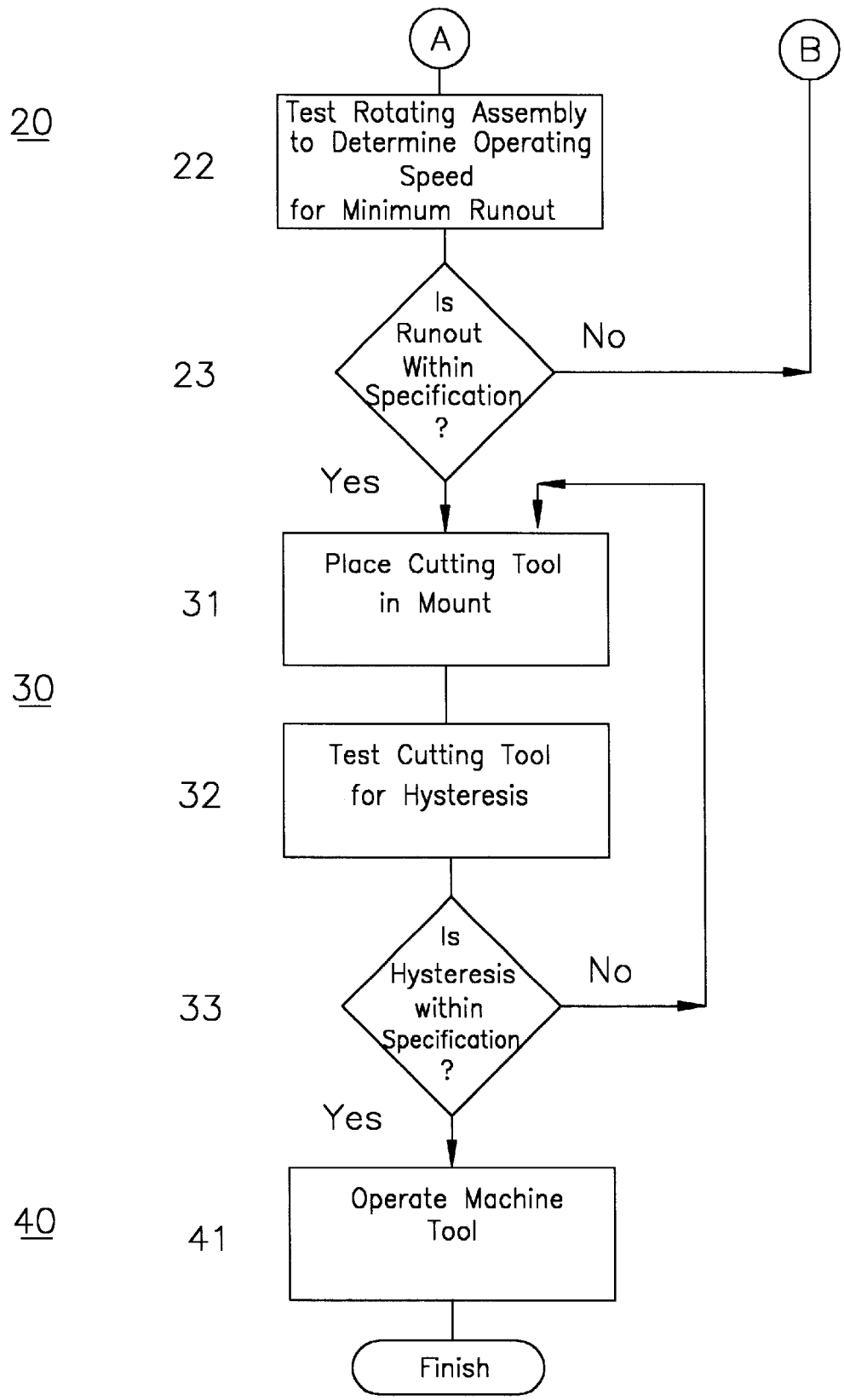

To maximize the precision of a machine tool, a series of set up steps and tests is performed on the tool with a surrogate work piece installed that accurately replicates the actual work pieces to be machined. These steps are illustrated in the drawing and consist of minimizing spindle run out, 10; testing the rotating assembly comprising the spindle and a work piece, 20; placing a cutting tool in a clamping means, 30; and operating the machine tool under optimal cutting conditions, 40. Once the optimal operating parameters are determined as described herein, the machine tool is the used to produce the desired products. The following description of the invention uses terminology common to lathe machining but should be understood to apply to other precision machine tools as well. The specific instruments and techniques for performing the tests of the below-described method are understood to be common to precision machine shops and familiar to those persons skilled in the art.

The first step, 10 and 20, in the METHOD FOR IMPROVING THE MACHINING ACCURACY OF A PRECISION MACHINE TOOL is to minimize spindle run out by minimizing physical play in the spindle, block 11. This is achieved by careful attention to the tightness of adjustable components such as screw clamps. Back lash suppression components are carefully adjusted to minimize back lash in the chosen direction of tool to work piece travel. Further attention is directed to verifying that the spindle bearing preload setting is correct, block 12. All rotating spindle components are then securely fastened and aligned, block 13. Next all rotating components are balanced, block 14. If balance is not within specification, resecuring and retesting is necessary, block 15. Run out for the combination of a surrogate work piece and the machine tool is then measured as a function of spindle rotation speed, blocks 21 and 22. Cutting speed is then selected at the minimum run out point closest to the desired cutting speed with the highest revolutions per minute (RPM) that does not cause excessive tool wear. If the desired precision of plus or minus one micrometer is not achieved, recheck and adjust as necessary the spindle component settings, paying particular attention to balance and alignment, block 23. Retest run out again for changes. Iterative testing in this manner will reveal the operating speed which provides minimal run out induced error.

The second step 30 is to secure the cutting tool into the tool holder, block 31. In the preferred embodiment, heat shrink clamping is preferred. Heat shrink clamping consists of selecting a tool holder having a cutting tool receiving bore slightly smaller than the diameter of the cutting tool shank. A difference in diameters of approximately four micrometers is usually sufficient. Next the tool holder is heated, causing the holder material to expand, thereby increasing the cutting tool receiving bore diameter. The cutting tool shank is inserted into the cutting tool receiving bore and the cutting tool is aligned as desired for the machine tool, whereupon the tool holder is cooled to constrict the diameter of the cutting tool receiving bore. This secures the cutting tool to the holder. The mounted cutting tool is then tested for deflection of the cutting tool tip, under a load approximating three times the expected tool loading, through several load/unload cycles using a tool dynamometer, block 32. A tool that returns to within one micrometer of its initial position demonstrates acceptable hysterisis, block 33. A hysterisis value of two micrometers may be acceptable under some circumstances. Depending on the machine tool to be used, other cutting tool holding devices such as solder clamping devices and hydraulic clamping devices may be employed after being tested for deflection and hysteresis as described above and demonstrating acceptable values thereof. After the cutting tool is suitably mounted to the tool holder, the tool holder is affixed to the machine tool in the manner by which the machine tool is designed.

The third step 40 is to select the optimum operating conditions of the machine tool. Cutting speed is determined from the spindle run out tests and selected to coincide with the speed providing the minimal spindle run out error. Each machine tool will have an individual optimal operating speed which provides minimal run out error. This speed is detemined by testing as described above. Depth of cut selection may be based on operator experience or also determined by testing for the optimal value for the combination of machine, tool and work piece.

The final step is to program the machine tool to operate under the conditions determined by the testing described above to provide the most precise results, block 41. Cutting speed is determined from the spindle run out test. Depth of cut is set at that depth shown to develop cutting tool deflection forces within the acceptable cutting tool deflection range. The rate of cutting tool to work piece feed is set at that rate demonstrated to reliably provide the most precision. Lastly, the machine tool is programmed to always feed the cutting tool into the work piece from only one direction. This unidirectional loading minimizes the machine tool hysteresis effect.

While the particular METHOD FOR IMPROVING THE MACHINING ACCURACY OF A PRECISION MACHINE TOOL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known to those of ordinary skill in the art are expressly incorporated herein by reference and are intended to be encompassed by the present claims. Moreover, it is not necessary for a method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

What is claimed is:

1. A method for achieving machining accuracy of plus or minus one micrometer with a machining tool having a nominal design accuracy of approximately plus or minus five micrometers comprising:

providing a machining tool having a nominal design accuracy of approximately plus or minus five micrometers and having a rotatable spindle assembly, a backlash suppression assembly, a spindle bearing having a pre-load adjustment mechanism, and a cutting tool holder, wherein the spindle assembly, backlash suppression assembly and the spindle bearing preload adjustment mechanism each have design specifications;

installing a work piece in the spindle assembly;

adjusting the physical play in the spindle assembly to a minimum in accordance with the spindle assembly design specifications;

adjusting the back lash suppression assembly to a minimum of backlash in one direction of tool-to-work piece travel in accordance with the backlash suppression assembly design specifications;

adjusting the spindle bearing pre-load setting to the spindle bearing preload adjustment mechanism design specifications;

rotating and balancing the spindle assembly and work piece;

measuring spindle run out as a function of spindle rotation speed to determine at least one speed at which spindle run out is no more than one micrometer;

mounting a cutting tool into the cutting tool holder; and operating the machine tool at a spindle rotating speed having an acceptable measured spindle run out.

2. The method as in claim 1 wherein the step of measuring spindle run out as a function of spindle rotation speed includes determining spindle resonant frequencies and the step of operating the machine tool includes avoiding operating at the determined spindle resonant frequencies.

3. The method as in claim 1 further comprising testing the mounted cutting tool for hysteresis and demonstrating a measured hysteresis value of less than or equal to plus or minus one micrometer.

4. The method as in claim 1 wherein the step of operating the machine tool includes consistently feeding the cutting tool to the work piece in the one direction of tool-to-work piece travel to which the backlash suppression assembly is adjusted.

5. A method for achieving machining accuracy of plus or minus one micrometer with a machining tool having a nominal design accuracy of approximately plus or minus five micrometers comprising:

providing a machining tool having a nominal design accuracy of approximately plus or minus five micrometers and having a rotatable spindle assembly, a backlash suppression assembly, a spindle bearing having a preload adjustment mechanism, and a cutting tool holder, wherein the spindle assembly, backlash suppression assembly and the spindle bearing preload adjustment mechanism each have design specifications;

installing a work piece in the spindle assembly;

adjusting the physical play in the spindle assembly to a minimum in accordance with the spindle assembly design specifications;

adjusting the back lash suppression assembly to a minimum of backlash in one direction of tool-to-work piece travel in accordance with the backlash suppression assembly design specifications;

adjusting the spindle bearing preload to the spindle bearing preload adjustment design specifications;

rotating and balancing the spindle assembly and work piece;

measuring spindle run out as a function of spindle rotation speed to determine at least one speed at which spindle run out is no more than one micrometer and determining spindle resonant frequencies;

mounting a cutting tool into the cutting tool holder; and operating the machine tool at a spindle rotating speed having an acceptable measured spindle run out while avoiding operating at the determined spindle resonant frequencies.

6. The method as in claim 5 wherein the step of operating the machine tool includes consistently feeding the cutting tool to the work piece in the one direction of tool-to-work piece travel to which the backlash suppression assembly is adjusted.

7. The method as in claim 6 further comprising testing the mounted cutting tool for hysteresis and demonstrating a measured hysteresis value of less than or equal to plus or minus one micrometer.

8. A method for achieving machining accuracy of plus or minus one micrometer with a machining tool having a nominal design accuracy of approximately plus or minus five micrometers comprising:

providing a machining tool having a nominal design accuracy of approximately plus or minus five micrometers and having a rotatable spindle assembly, a backlash suppression assembly, a spindle bearing having a preload adjustment mechanism, and a cutting tool holder, wherein the spindle assembly, backlash suppression assembly and the spindle bearing preload adjustment mechanism each have design specifications;

installing a work piece in the spindle assembly;

adjusting the physical play in the spindle assembly to a minimum in accordance with the spindle assembly design specifications;

adjusting the back lash suppression assembly to a minimum of backlash in one direction of tool-to-work piece travel in accordance with the backlash suppression assembly design specifications;

adjusting the spindle bearing preload setting to the spindle bearing preload adjustment mechanism design specifications;

rotating and balancing the spindle assembly and work piece;

measuring spindle run out as a function of spindle rotation speed to determine at least one speed at which spindle run out is no more than one micrometer and determining spindle resonant frequencies;

mounting a cutting tool into the cutting tool holder; and operating the machine tool by consistently feeding the cutting tool to the work piece in the one direction of tool-to-work piece travel to which the backlash suppression assembly is adjusted at a spindle rotating speed having an acceptable measured spindle run out while avoiding operating at the determined spindle resonant frequencies.

9. The method as in claim 8 further comprising testing the mounted cutting tool for hysteresis and demonstrating a measured hysteresis value of less than or equal to plus or minus one micrometer.

* * * * *